F. L. WILSON.
APPARATUS FOR SEPARATING AND RECOVERING METALLIFEROUS COMPOUNDS
AND GASES FROM LIQUIDS.
APPLICATION FILED MAR. 13, 1914.
1,167,460.
Patented Jan. 11, 1916.
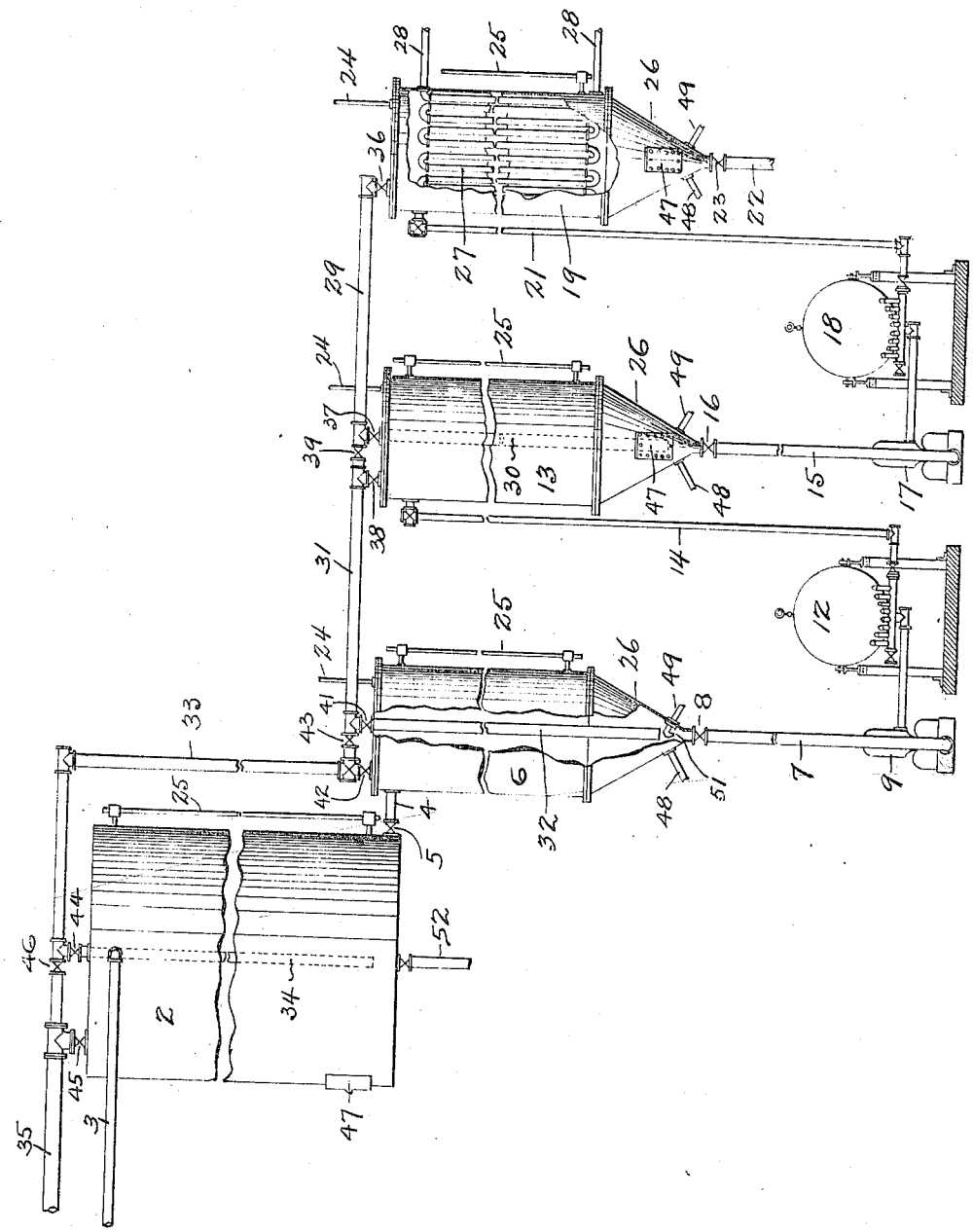
WITNESSES:
INVENTOR.
FRANK L. WILSON
BY Miller & White
his ATTORNEYS.

UNITED STATES PATENT OFFICE.

FRANK L. WILSON, OF BERKELEY, CALIFORNIA.

APPARATUS FOR SEPARATING AND RECOVERING METALLIFEROUS COMPOUNDS AND GASES FROM LIQUIDS.

1,167,460.

Specification of Letters Patent.

Patented Jan. 11, 1916.

Application filed March 18, 1914. Serial No. 825,685.

*To all whom it may concern:*

Be it known that I, FRANK L. WILSON, a citizen of the United States, and a resident of Berkeley, Alameda county, State of California, have invented certain new and useful Improvements in Apparatus for Separating and Recovering Metalliferous Compounds and Gases from Liquids, of which the following is a specification.

The invention relates to a method of and an apparatus for separating and recovering metalliferous compounds and gases from liquors, such as ammoniacal liquors which are obtained in the reduction of zinc, coper, nickel and other ores.

The object of the invention is to provide a continuous process for separating and recovering the metalliferous compounds and gases from liquors obtained in the reduction of ores.

Another object of the invention is to provide an apparatus for accomplishing the continuous boiling out of the liquors and the recovery of the metalliferous compounds and gases.

The invention possesses other advantageous features, which, with the foregoing, will be set forth at length in the following description, where I have outlined in full that form of the invention which I have selected for illustration in the drawing accompanying and forming part of the present specification. The novelty of the invention will be included in the claims succeeding said description. From this it will be apparent that I do not limit myself to the showing made by said drawings and description and I may adopt many variations within the scope of my invention as set forth in said claims.

The drawing is an elevation of one form of the apparatus of my invention, parts thereof being broken away to reduce the size of the figure and to disclose the interior construction.

The method and apparatus of my invention is particularly adapted, but not limited, to the boiling out of ammoniacal liquors which are obtained in the reduction of zinc, copper or nickel ores by the employment of ammonia and carbon dioxid, and permits of the continuous recovery of the ammoniacal gases and the metals in the form of basic carbonates and hydrates. By a continuous passage of the metal-charged ammoniacal liquors through the apparatus, a large tonnage can be treated per day in a comparatively small apparatus and at a minimum cost. The metal-charged ammoniacal liquors are passed through the apparatus in one direction and the hot gases are passed through in the opposite direction and give up their heat to the liquors as they pass, so that the liquors are continuously raised in temperature as they pass through the apparatus and the gases are continuously lowered in temperature.

The apparatus consists of a battery of units, the removal of any one of which, will in no way delay or interfere with the continuous passage of the liquors or gases. The units are of simple construction, preferably cylindrical in design and are constructed so that the interior is readily accessible. They are made of sufficient strength to withstand internal pressure and violent boiling and are provided with pressure gages and gage glasses and are covered with heat insulating material. In passing from one still or unit to the other, the hot gases and vapors impart heat to the succeeding stills and the gases gradually take up an increasing percentage of ammoniacal vapors until finally, when they emerge from the last or liquor receiving still, the gases contain most of the more volatile ammoniacal gases. In this manner the gases increase in value during their passage to the absorbers and the liquor decreases in ammoniacal value during its passage to the fixed-ammonia still.

I will first trace the flow of the liquor through the apparatus and then the flow of the gases or vapors. The ammoniacal liquor is first flowed into the charging tank 2 through the pipe 3, from which it passes through the pipe 4, equipped with a valve 5 into the still 6. From still 6 it flows through the pipe 7, equipped with a valve 8, to the pump 9, which forces it through the filter 12 and into still 13 through the pipe 14. From still 13 it flows through the pipe 15, provided with a valve 16 to the pump 17 which forces it through the filter 18 and into the fixed-ammonia still 19 through the pipe 21, and the resultant liquor is discharged from still 19, through the pipe 22 which is provided with a valve 23. Each of the stills 6, 13 and 19 are provided with safety pressure exhausts 24, gage glasses 26 and removable plates 47 as is also the receiving tank 2. The stills are preferably cylindrical in shape and are provided with cone-shaped bottoms 26, to facilitate the discharge of the precipitates formed therein.

Arranged in the fixed ammonia still 19 is a coil of pipe 27, the opposite ends 28 of which extend through the wall of the still. One of the pipes 28 extends to a boiler or other source of live hot steam and by passing the steam through the coil, the liquor in the still is caused to boil. The hot gases and vapors driven off by the high temperature and ebullition pass through the pipe 29 and down through the pipe 30 which terminates adjacent the bottom of still 13. The hot gases bubble up through the liquor in still 13 and pass through the pipe 31 and down through the pipe 32 which terminates adjacent the bottom of still 6, whence they bubble up through the liquor in still 6. From still 6, the gases pass through pipe 33 and down pipe 34 which terminates adjacent the bottom of tank 2, when they bubble up through the liquor therein and pass through the pipe 35 to suitable absorbers. In order that the flow of the gases and vapors may be controlled and regulated or shunted around any still, valves are arranged in the gas conductors. A valve 36 is arranged between still 19 and pipe 29 and a valve 37 is arranged between pipes 29 and 30. A valve 38 is arranged between still 13 and pipe 31 and a valve 39 is arranged between pipes 31 and 29. Ordinarily valves 37 and 38 are open and valve 39 is closed, but when it is desirable to cut out still 13, the valves 37 and 38 are closed and valve 39 is opened. Similar valves 41, 42 and 43 are arranged respectively between pipes 31 and 32, still 6 and pipe 33 and pipes 31 and 33 for similar reasons as are also the valves 44, 45 and 46 which control the passage of the gases and vapors into and out of the tank 2.

In the event that it is advisable to introduce live steam into the stills as an aid to proper boiling, I have provided each still at the bottom with two steam pipes 48 and 49, the pipe 49 preferably terminating in a down turned nozzle 51, so that the steam may be directed toward the discharge outlet. The liquor which is fed into the charging tank 2 is a strong ammoniacal solution and as the ammonia is driven off, the metals are precipitated in the form of basic carbonates and hydrates. The vapors entering tank 2 are not sufficiently heated to raise the temperature of the liquor sufficiently high to cause a precipitation of any material amount of basic carbonates or hydrates, but if any precipitation does occur, the precipitates may be discharged through the valve controlled pipe 52. The warmed liquor then passes into still 6, wherein its temperature is raised by the gases and vapors passing therethrough, causing the separation of part of the ammonia and the precipitation of part of the basic carbonates and hydrates. The liquor then passes through the filter 12, in which the carbonates and hydrates are removed and passes into still 13. In this still the hot gases and vapors maintain a temperature sufficiently high to drive off substantially all of the free ammonia from the liquor and precipitates substantially all of the basic carbonates and hydrates, which are removed in the filter 18. The resultant liquor, which contains ammonia in a fixed or combined condition only, then passes into still 19. In this still, the temperature is higher than in the other stills and milk of lime is added at the point of most violent boiling, to free the fixed ammonia, if any is present, which together with the steam and vapor then passes through the other stills, raising the temperature of the liquor therein.

I claim:

1. In an apparatus of the character described, a series of closed stationary containers adapted to contain liquid, conduits for conveying the liquid from one container to the next, means for directly heating the liquid in the last container of the series and conductors arranged to convey the hot vapors formed in the last container through the other containers successively.

2. In an apparatus of the character described, a series of closed containers adapted to contain liquid, conductors connecting said containers in series arranged to convey the liquid from the bottom of one container to the top of the next, a filter arranged between each successive pair of containers, a steam coil arranged in the last container of the series and conductors arranged to convey the vapors formed therein through the other containers successively.

3. In an apparatus of the character described, a plurality of stationary stills, conduits connecting the successive stills arranged to convey liquid from one still to the other, means for heating the liquid in the last still to form vapor therein, conductors partially inclosed in said containers for conveying the vapor successively through the other stills and valves in said conductors whereby the vapor may be shunted past any of said other stills.

4. In an apparatus of the character described, a series of stills, conductors connecting the bottom of one still with the top of the successive still, a pump and a filter in each of said conductors, a steam coil in the last still arranged to cause the liquid therein to boil, a conductor extending from each still into and below the level of the liquid in the next preceding still and a charging tank for the stills through which the vapors pass.

5. In an apparatus of the character described, a series of closed containers adapted to contain liquid, conduits connecting the successive containers and arranged to convey liquid from one to the other, a filter arranged between each successive pair of containers, means for properly removing the precipitated metalliferous compounds mixed with a portion of liquid from the said containers, means for conveying the said mixture to the said filters, and means for conveying the filtered liquid from the filter to the succeeding still.

In testimony whereof, I have hereunto set my hand at Ingot, Shasta county, California, this 7th day of March, 1914.

FRANK L. WILSON.

In presence of—
   GLADYS E. TURNER,
   GEO. GILMER.